(12) United States Patent
Choi et al.

(10) Patent No.: US 7,466,312 B2
(45) Date of Patent: Dec. 16, 2008

(54) LEVEL SHIFTER CIRCUIT AND METHOD FOR CONTROLLING VOLTAGE LEVELS OF CLOCK SIGNAL AND INVERTED CLOCK SIGNAL FOR DRIVING GATE LINES OF AMORPHOUS SILICON GATE-THIN FILM TRANSISTOR LIQUID CRYSTAL DISPLAY

(75) Inventors: Chul Choi, Seoul (KR); Jae-Goo Lee, Yongin-si (KR); Byung-Hun Han, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 941 days.

(21) Appl. No.: 10/987,430

(22) Filed: Nov. 12, 2004

(65) Prior Publication Data

US 2005/0104647 A1  May 19, 2005

(30) Foreign Application Priority Data

Nov. 13, 2003  (KR)  ............... 10-2003-0080190

(51) Int. Cl.
*G09G 3/36* (2006.01)
*G09G 3/38* (2006.01)

(52) U.S. Cl. .............. 345/211; 345/100; 345/204; 327/333; 327/536; 327/537

(58) Field of Classification Search ........... 345/55–100, 345/204–214; 327/333, 536, 537
See application file for complete search history.

(56) References Cited

U.S. PATENT DOCUMENTS

| | | | |
|---|---|---|---|
| 6,670,944 B1 * | 12/2003 | Ishii | 345/100 |
| 6,700,436 B2 * | 3/2004 | Shim | 327/536 |
| 6,836,269 B2 * | 12/2004 | Maeda et al. | 345/87 |
| 7,248,243 B2 * | 7/2007 | Murakami et al. | 345/98 |
| 2005/0057481 A1 * | 3/2005 | Chung | 345/100 |

FOREIGN PATENT DOCUMENTS

| | | |
|---|---|---|
| JP | 9-6295 | 1/1997 |
| JP | 00-49583 | 2/2000 |
| JP | 01-326570 | 11/2001 |
| KR | 03-50352 | 6/2003 |
| KR | 1020030054896 | 7/2003 |
| KR | 1020030070265 | 8/2003 |

OTHER PUBLICATIONS

English Abstract Only.

* cited by examiner

*Primary Examiner*—David L Lewis
(74) *Attorney, Agent, or Firm*—F. Chau & Associates, LLC

(57) ABSTRACT

Provided are a level shifter circuit and a corresponding method for controlling voltage levels of a clock signal and an inverted clock signal for driving gate lines of a ASG thin film transistor liquid crystal display panel, where the level shifter circuit includes first and second level shifters, the first level shifter controls the voltage level of the clock signal to swing between a negative external voltage level and a positive external voltage level in response to a clock activating signal, and increases the voltage level of the clock signal from the negative external voltage level to a power supply voltage level or decreases it from the positive external voltage level to a ground voltage level while a pre-charge clock activating signal is activated, the second level shifter controls the voltage level of the inverted clock signal to swing between the negative external voltage level and the positive external voltage level in response to an inverted clock activating signal, and increases the voltage level of the inverted clock signal from the negative external voltage level to the power supply voltage level or decreases it from the positive external voltage level to the ground voltage level while an inverted pre-charge clock activating signal is activated, and the level shifter circuit increases or decreases the voltage levels of the clock signal and inverted clock signal using a battery voltage or a ground voltage, thereby reducing current consumption caused by the increase or decrease in the voltage level.

20 Claims, 6 Drawing Sheets

LEVEL SHIFTER CIRCUIT AND METHOD FOR CONTROLLING VOLTAGE LEVELS OF CLOCK SIGNAL AND INVERTED CLOCK SIGNAL FOR DRIVING GATE LINES OF AMORPHOUS SILICON GATE-THIN FILM TRANSISTOR LIQUID CRYSTAL DISPLAY

CROSS-REFERENCE TO RELATED APPLICATION

This application claims foreign priority under 35 U.S.C. § 119 to Korean Patent Application No. 2003-80190, filed on Nov. 13, 2003, in the Korean Intellectual Property Office, the disclosure of which is incorporated herein by reference in its entirety.

BACKGROUND OF THE INVENTION

1. Field of the Invention

The present invention relates to voltage level shifter circuits and, more particularly, to a voltage level shifter circuit that controls voltage levels of a clock signal and an inverted clock signal for driving gate lines of a liquid crystal display panel.

2. Description of the Related Art

A small thin film transistor liquid crystal display (TFT-LCD), which is generally applied to a portable display such as a mobile communications terminal, includes a source driver that drives sources lines, a gate driver that drives gate lines, and a power integrated circuit that provides power voltages to the liquid crystal display panel, where the source and gate drivers use charge pumping.

Figure 1:
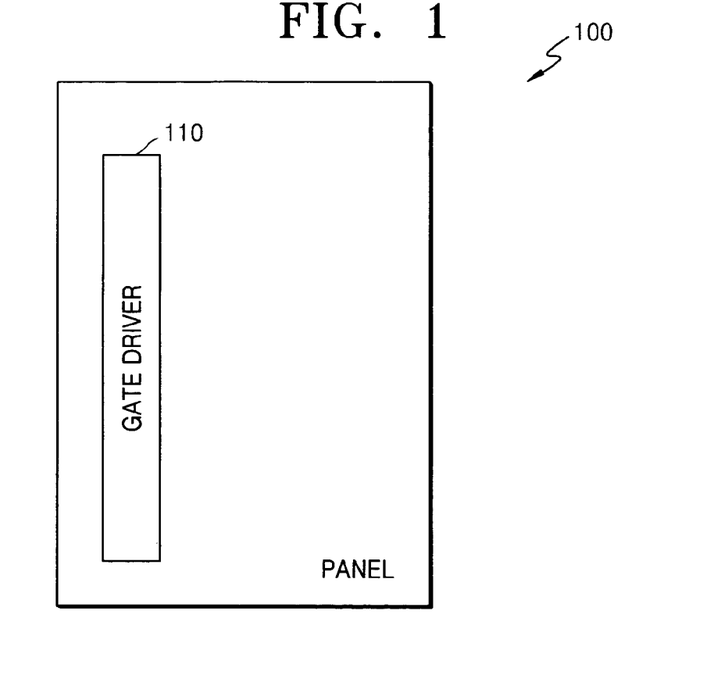
FIG. 1 shows a schematic diagram indicating the structure of an ASG panel.

FIG. 1 shows the structure of an amorphous silicon gate (ASG) panel, indicated generally by the reference numeral 100. Referring to FIG. 1, the ASG panel 100 has a gate driver 110 formed in amorphous silicon. Thus, the number of external components of the display panel 100 is low to save costs.

Figure 2:
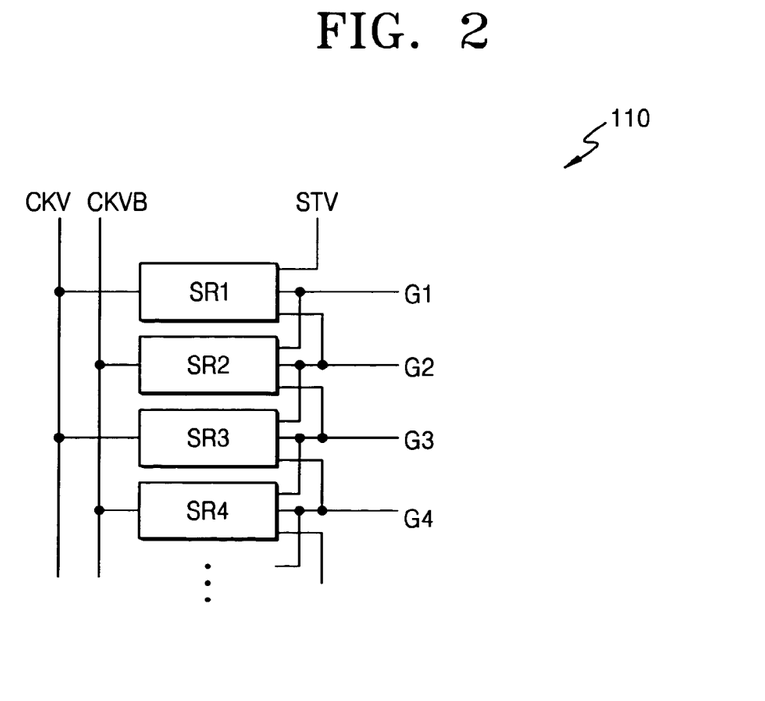
FIG. 2 shows a schematic diagram indicating the configuration of the gate driver of FIG. 1.

FIG. 2 shows the configuration of the gate driver of FIG. 1, indicated generally by the reference numeral 110. Referring to FIG. 2, the gate driver 110 of the ASG panel includes a plurality of shift registers SR1, SR2, SR3 and SR4 that sequentially turn on gate lines G1, G2, G3 and G4, respectively, in response to a clock signal CKV and an inverted clock signal CKVB.

When a start pulse STV drives the first shift register SR1, the first shift register SR1 turns on the first gate line G1 in response to the clock signal CKV. The turned on first gate line G1 drives the second shift register SR2, and the second shift register SR2 turns on the second gate line G2 in response to the inverted clock signal CKVB. The turned on second gate line G2 drives the third shift register SR3 and, simultaneously, turns off the first shift register SR1. In this manner, the gate lines G1, G2, G3 and G4 are sequentially turned on.

The odd-numbered shift registers including the first and third shift registers SR1 and SR3 are operated in synchronization with the clock signal CKV whereas the even-numbered shift registers including the second and fourth shift registers SR2 and SR4 are operated in synchronization with the inverted clock signal CKVB. This is for increasing a speed of turning on the gate lines G1, G2, G3 and G4.

A gate driver of a general liquid crystal display is provided in an external driver unit of the display panel. The liquid crystal display includes level shifters as many as shift registers of the gate driver in order to generate a voltage for driving the shift registers.

However, the ASG panel 100 has the gate driver 110 included therein, as shown in FIG. 1. Accordingly, level shifters (not shown) that supply the clock signal CKV, inverted clock signal CKVB, and start pulse STV to the gate driver 110 and control voltage levels of the clock signal CKV, inverted clock signal CKVB and start pulse STV are provided in an external driver installed outside the panel 100.

While the conventional liquid crystal display requires level shifters numbering as many as the shift registers, the driver (not shown) that drives the ASG panel 100 includes only three level shifters that provide the clock signal CKV, inverted clock signal CKVB and start pulse STV.

Figure 3:
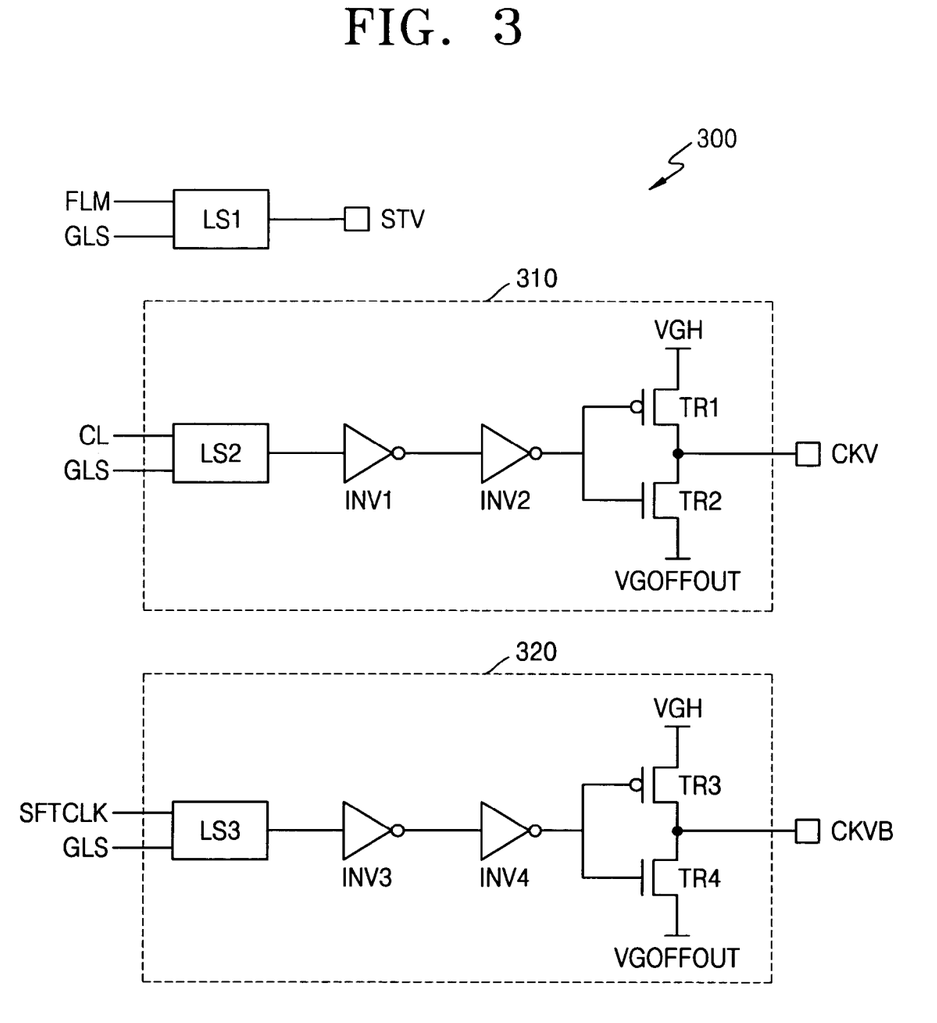
FIG. 3 shows a schematic diagram indicating the configuration of a conventional level shifter circuit that generates signals for driving the gate driver of FIG. 2.

FIG. 3 shows the configuration of a conventional level shifter circuit, indicated generally by the reference numeral 300. The conventional level shifter circuit 300 generates the signals for driving the gate driver 110 of FIG. 2. Referring to FIG. 3, the level shifter circuit 300 includes first, second and third level shifters 310, 320 and LS1.

The first level shifter 310 generates the clock signal CKV in response to a clock-activating signal CL, and the second level shifter 320 generates the inverted clock signal CKVB in response to an inverted clock-activating signal SFTCLK. The third level shifter LS1 generates the start pulse STV in response to a frame-driving signal FLM.

The first, second and third level shifters 310, 320 and LS1 receive a select signal GLS. The level shifter circuit 300 is installed at two points in the driver (not shown) in consideration of positions of the driver and panel, which is not shown in FIG. 3.

The select signal GLS selects one of the two level shifter circuits installed in the driver. Thus, the level shifter circuit 300 of FIG. 3 is operated when the select signal GLS has a high level.

A level shifting logic LS2 of the first level shifter 310 amplifies a voltage level of the clock-activating signal CL, and inverts a logic level of the clock-activating signal CL. When the clock-activating signal CL has a high level, the level shifting logic LS2 and inverters INV1 and INV2 output the clock-activating signal CL having a low level. Then, a first transistor TR1 is turned on and a second transistor TR2 is turned off. Accordingly, the voltage level of the clock signal CKV is increased to a positive external voltage VGH.

When the clock-activating signal CL has a low level, the second transistor TR2 is turned on and the first transistor TR1 is turned off. Thus, the voltage level of the clock signal CKV is decreased to a negative external voltage VGOFFOUT.

As described above, the clock activating signal CL is output as the clock signal CKV that swings between the positive external voltage VGH and negative external voltage VGOFFOUT according to the first level shifter 310.

The second level shifter 320 receives the inverted clock activating signal SFTCLK and outputs the inverted clock signal CKVB that swings between the positive external voltage level VGH and negative external voltage level VGOFFOUT.

Amorphous silicon in which the gate driver 110 of the ASG panel 100 is formed has a low mobility and poor on/off characteristic. Thus, a level shifter circuit that makes the clock signal CKV, inverted clock signal CKVB and start pulse STV have a wide swing range of −10V to +15V is required in order to drive the gate driver 110. In the case of the portable display such as a mobile communication terminal, a voltage level of −10V to +15V is obtained by boosting or dropping a battery voltage using a charge pump circuit.

When a voltage generated using the level shifter circuit 300 is used to drive gate lines, current consumption is increased in proportion to a voltage level boosted or dropped in the level shifter circuit 300 and the swing range of the level shifter circuit 300.

The quantity of current consumed by the level shifter circuit 300 installed in the driver (not shown) to drive the gate driver 110 of the ASG panel 100 is determined by $I=C*V*f$. Here, C is a load of gate lines, V is a swing range of the level shifter, and f is an operating frequency.

To generate a clock signal CKV having a positive external voltage level VGH of 15V for example, when a battery voltage is 2.5V, the voltage level 2.5V should be boosted six times using a charge pump circuit. In this case, the quantity of current consumed when the voltage level of the clock signal CKV is boosted from the negative external voltage level VGOFFOUT to the positive external voltage level VGH is increased six times.

That is, the first and second level shifters 310 and 320 of the conventional level shifter circuit 300 that generates the clock signal CKV and inverted clock signal CKVB drive the entire gate lines of the ASG panel 100 so that the quantity of current consumed by the conventional level shifter circuit 300 is undesirably high.

SUMMARY OF THE INVENTION

The present disclosure provides a level shifter circuit that can reduce current consumption by increasing or decreasing voltage levels of a clock signal and an inverted clock signal using a battery voltage for a predetermined period of time.

The present disclosure also provides a corresponding method that can reduce current consumption by increasing or decreasing the voltage levels of the clock signal and inverted clock signal using the battery voltage for a predetermined period of time.

According to an aspect of the present disclosure, there is provided a level shifter circuit including first and second level shifters.

The first level shifter controls a voltage level of a clock signal to swing between a negative external voltage level and a positive external voltage level in response to a clock activating signal, and increases the voltage level of the clock signal from the negative external voltage level to a power supply voltage level or decreases it from the positive external voltage level to a ground voltage level while a pre-charge clock activating signal is activated.

The second level shifter controls a voltage level of an inverted clock signal to swing between the negative external voltage level and the positive external voltage level in response to an inverted clock activating signal, and increases the voltage level of the inverted clock signal from the negative external voltage level to the power supply voltage level or decreases it from the positive external voltage level to the ground voltage level while an inverted pre-charge clock activating signal is activated.

The pre-charge clock-activating signal is activated for a predetermined period of time after the rising edge of the clock-activating signal and for a predetermined period of time after the falling edge thereof. The inverted pre-charge clock-activating signal is activated for a predetermined period of time after the rising edge of the inverted clock-activating signal and for a predetermined period of time after the falling edge thereof.

The first level shifter includes a first pre-charge controller, a first level controller, and a first control logic.

The first pre-charge controller increases the voltage level of the clock signal from the negative external voltage level to the power supply voltage level or decreases it from the positive external voltage level to the ground voltage level in response to first and second pre-charge control signals.

The first level controller increases the voltage level of the clock signal from the power supply voltage level to the positive external voltage level or decreases it from the ground voltage level to the negative external voltage level in response to first and second level control signals.

The first control logic generates the first and second pre-charge control signals and the first and second level control signals in response to the clock activating signal, the pre-charge clock-activating signal, and a pre-charge operating signal.

The first pre-charge controller is operated only when the pre-charge operating signal is activated.

The first pre-charge controller includes first and second pre-charge transistors.

The first pre-charge transistor has a first terminal connected to the power supply voltage, a gate receiving the first pre-charge control signal, and a second terminal connected to a first node. The second pre-charge transistor has a first terminal connected to the first node, a gate receiving the second pre-charge control signal, and a second terminal connected to the ground voltage. The clock signal is output from the first node.

The first level controller includes first and second level transistors.

The first level transistor has a first terminal connected to the positive external voltage, a gate receiving the first level control signal, and a second terminal connected to the first node. The second level transistor has a first terminal connected to the first node, a gate receiving the second level control signal, a second terminal connected to the negative external voltage. The clock signal is output from the first node.

The first control logic generates the first and second level control signals to turn off the first level controller and generates the first and second pre-charge control signals to control the voltage level of the clock signal when the pre-charge operating signal and the pre-charge clock activating signal are activated. In addition, the first control logic generates the first and second pre-charge control signals to turn off the first pre-charge controller and generates the first and second level control signals to control the voltage level of the clock signal when the pre-charge clock-activating signal is inactivated.

The second level shifter includes a second pre-charge controller, a second level controller, and a second control logic.

The second pre-charge controller increases the voltage level of the inverted clock signal from the negative external voltage level to the power supply voltage level or decreases it from the positive external voltage level to the ground voltage level in response to third and fourth pre-charge control signals.

The second level controller increases the voltage level of the inverted clock signal from the power supply voltage level to the positive external voltage level or decreases it from the ground voltage level to the negative external voltage level in response to third and fourth level control signals.

The second control logic that generates the third and fourth pre-charge control signals and the third and fourth level control signals in response to the inverted clock activating signal, inverted pre-charge clock activating signal, and pre-charge operating signal.

The second pre-charge controller is operated only when the pre-charge operating signal is activated.

The second pre-charge controller includes third and fourth pre-charge transistors.

The third pre-charge transistor has a first terminal connected to the power supply voltage, a gate receiving the third pre-charge control signal, and a second terminal connected to a second node. The fourth pre-charge transistor has a first terminal connected to the second node, a gate receiving the fourth pre-charge control signal, and a second terminal connected to the ground voltage. The inverted clock signal is output from the second node.

The second level controller includes third and fourth level transistors.

The third level transistor has a first terminal connected to the positive external voltage, a gate receiving the third level control signal, and a second terminal connected to the second node. The fourth level transistor having a first terminal connected to the second node, a gate receiving the fourth level control signal, a second terminal connected to the negative external voltage. The inverted clock signal is output from the second node.

The second control logic generates the third and fourth level control signals to turn off the second level controller and generates the third and fourth pre-charge control signals to control the voltage level of the inverted clock signal when the pre-charge operating signal and the inverted pre-charge clock activating signal are activated. In addition, the second control logic generates the third and fourth pre-charge control signals to turn off the second pre-charge controller and generates the third and fourth level control signals to control the voltage level of the inverted clock signal when the inverted pre-charge clock-activating signal is inactivated.

The first and second level shifters receive a select signal and they are operated when the select signal is activated.

The level shifter circuit further comprises a third level shifter that generates a start pulse, which is activated for each frame, in response to the select signal and a frame driving signal, and controls a voltage level of the start pulse to swing between the negative external voltage level and the positive external voltage level.

According to another aspect of the present disclosure, there is provided a method of controlling a voltage level of a clock signal of a gate driver for driving a liquid crystal display panel, comprising receiving a clock activating signal and judging whether the clock activating signal has a first level or a second level; judging whether a pre-charge clock activating signal is activated when the clock activating signal has the first level; increasing the voltage level of the clock signal from a negative external voltage level to a power supply voltage level when the pre-charge clock activating signal is activated; increasing the voltage level of the clock signal from the power supply voltage level to a positive external voltage level when the pre-charge clock activating signal is not activated; judging whether the pre-charge clock activating signal is activated when the clock activating signal has the second level; decreasing the voltage level of the clock signal from the positive external voltage level to a ground voltage level when the pre-charge clock activating signal is activated; and decreasing the voltage level of the clock signal from the ground voltage level to the negative external voltage level when the pre-charge clock activating signal is not activated.

According to yet another aspect of the present disclosure, there is provided a method of controlling a voltage level of an inverted clock signal of a gate driver for driving a liquid crystal display panel, comprising receiving an inverted clock activating signal and judging whether the inverted clock activating signal has a first level or a second level; judging whether an inverted pre-charge clock activating signal is activated when the inverted clock activating signal has the first level; increasing the voltage level of the inverted clock signal from a negative external voltage level to a power supply voltage level when the inverted pre-charge clock activating signal is activated; increasing the voltage level of the inverted clock signal from the power supply voltage level to a positive external voltage level when the inverted pre-charge clock activating signal is not activated; judging whether the inverted pre-charge clock activating signal is activated when the inverted clock activating signal has the second level; decreasing the voltage level of the inverted clock signal from the positive external voltage level to a ground voltage level when the inverted pre-charge clock activating signal is activated; and decreasing the voltage level of the inverted clock signal from the ground voltage level to the negative external voltage level when the inverted pre-charge clock activating signal is not activated.

BRIEF DESCRIPTION OF THE DRAWINGS

The above and other features and advantages of the present disclosure will become more apparent by describing in detail exemplary embodiments thereof with reference to the attached drawings, in which.

DETAILED DESCRIPTION OF PREFERRED EMBODIMENTS

Preferred embodiments of the present invention will now be described more fully with reference to the accompanying drawings, in which exemplary embodiments are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals may be used to refer to like elements.

Figure 4:
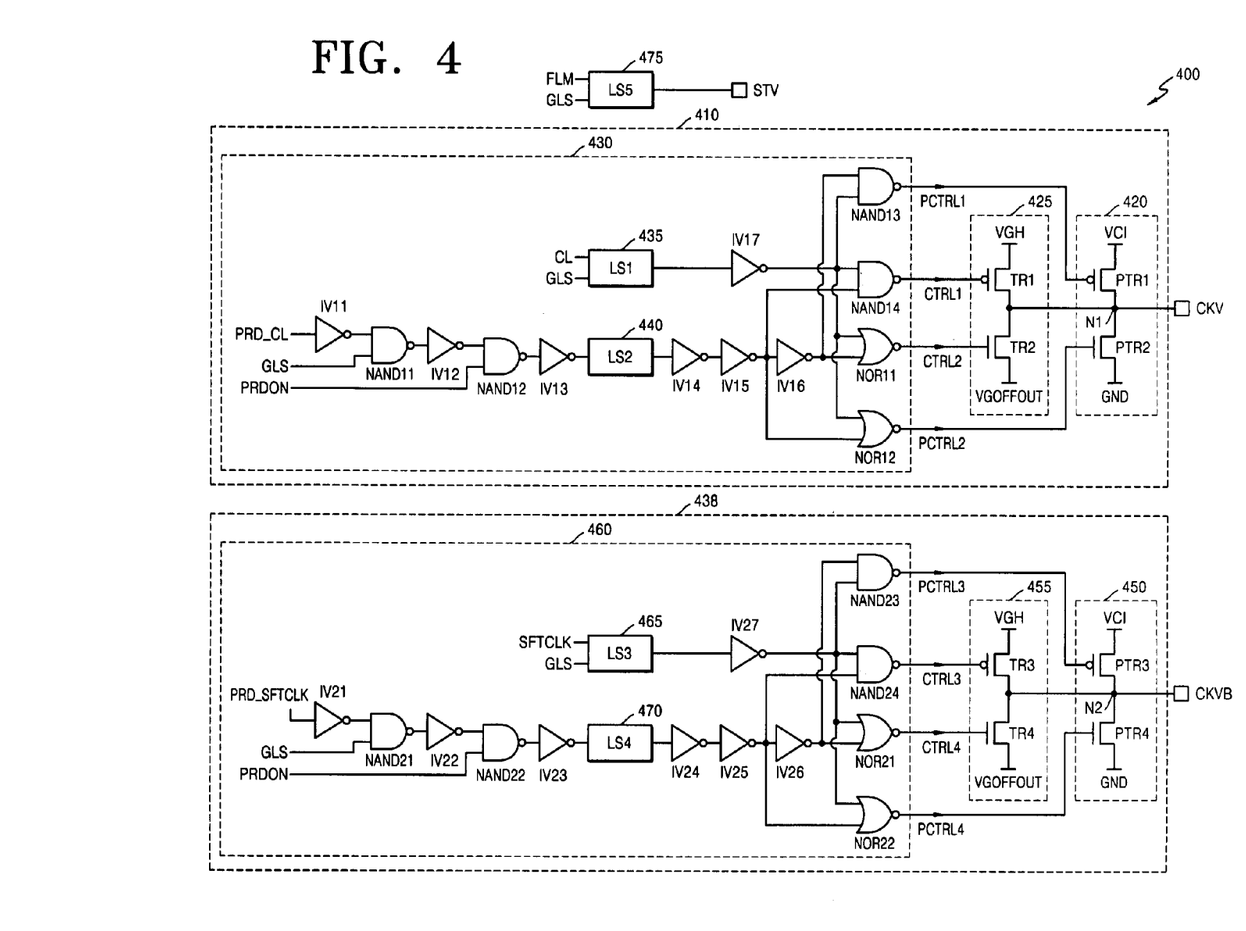
FIG. 4 shows a circuit diagram of a level shifter circuit according to an embodiment of the present disclosure.

As shown in FIG. 4, a level shifter circuit according to an embodiment of the present disclosure is indicated generally by the reference numeral 400. Referring to FIG. 4, the level shifter circuit 400 according to an embodiment of the present disclosure includes first and second level shifters 410 and 420. The first level shifter 410 controls a voltage level of a clock signal CKV to swing between a negative external voltage level VGOFFOUT and a positive external voltage level VGH in response to a clock-activating signal CL. In addition, the first level shifter 410 increases the voltage level of the clock signal CKV from the negative external voltage level VGOFFOUT to a power supply voltage VCI or decreases it from the positive external voltage level VGH to a ground voltage GND while a pre-charge clock activating signal PRD_CL is activated.

The second level shifter 440 controls a voltage level of an inverted clock signal CKVB to swing between the negative external voltage level VGOFFOUT and the positive external voltage level VGH in response to an inverted clock-activating signal SFTCLK. In addition, the second level shifter 440 increases the voltage level of the inverted clock signal CKV from the negative external voltage level VGOFFOUT to the power supply voltage VCI or decreases it from the positive external voltage level VGH to the ground voltage GND while an inverted pre-charge clock activating signal PRD_SFTCLK is activated.

The pre-charge clock activating signal PRD_CL is activated for a predetermined period of time after the rising edge of the clock activating signal CL and for a predetermined period of time after the falling edge of the clock activating signal CL. The inverted pre-charge clock activating signal PRD_SFTCLK is activated for a predetermined period of time after the rising edge of the inverted clock activating signal SFTCLK and for a predetermined period of time after the falling edge of the inverted clock activating signal SFTCLK.

Figure 5:
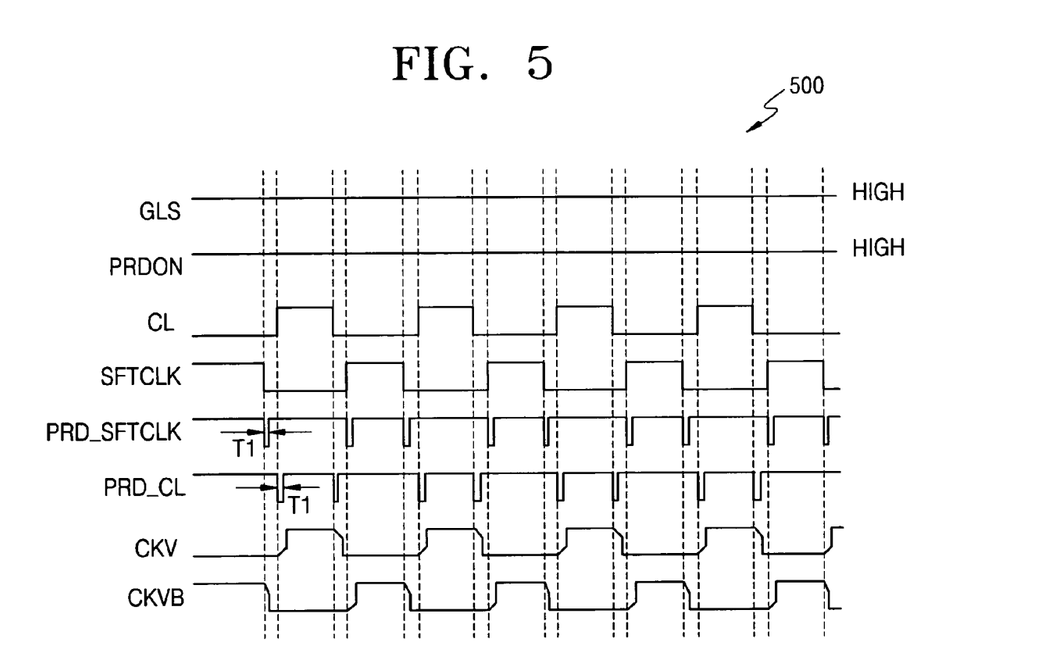
FIG. 5 shows an operating timing diagram for explaining the operation of the level shifter circuit shown in FIG. 4.

Turning to FIG. 5, an operating timing diagram for explaining the operation of the level shifter circuit shown in FIG. 4 is indicated generally by the reference numeral 500.

Figure 6:
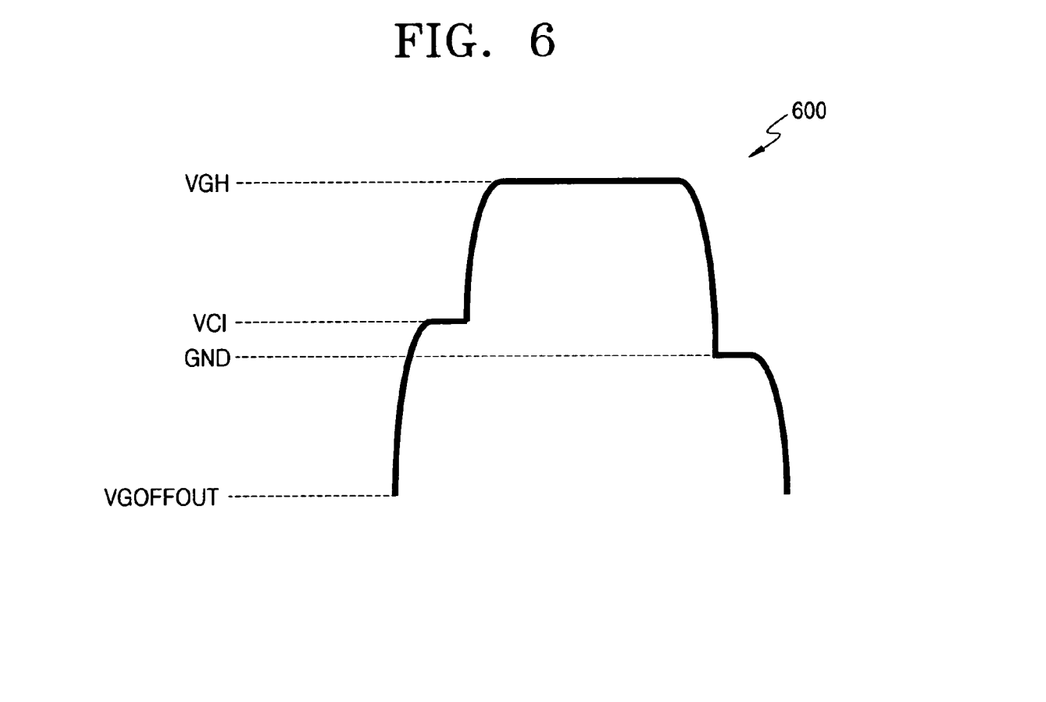
FIG. 6 shows a voltage diagram indicating a variation in a voltage level of the clock signal or inverted clock signal of FIG. 4.

Turning now to FIG. 6, a voltage diagram showing a variation in a voltage level of the clock signal or inverted clock signal of FIG. 4 is indicated generally by the reference numeral 600.

Figure 7:
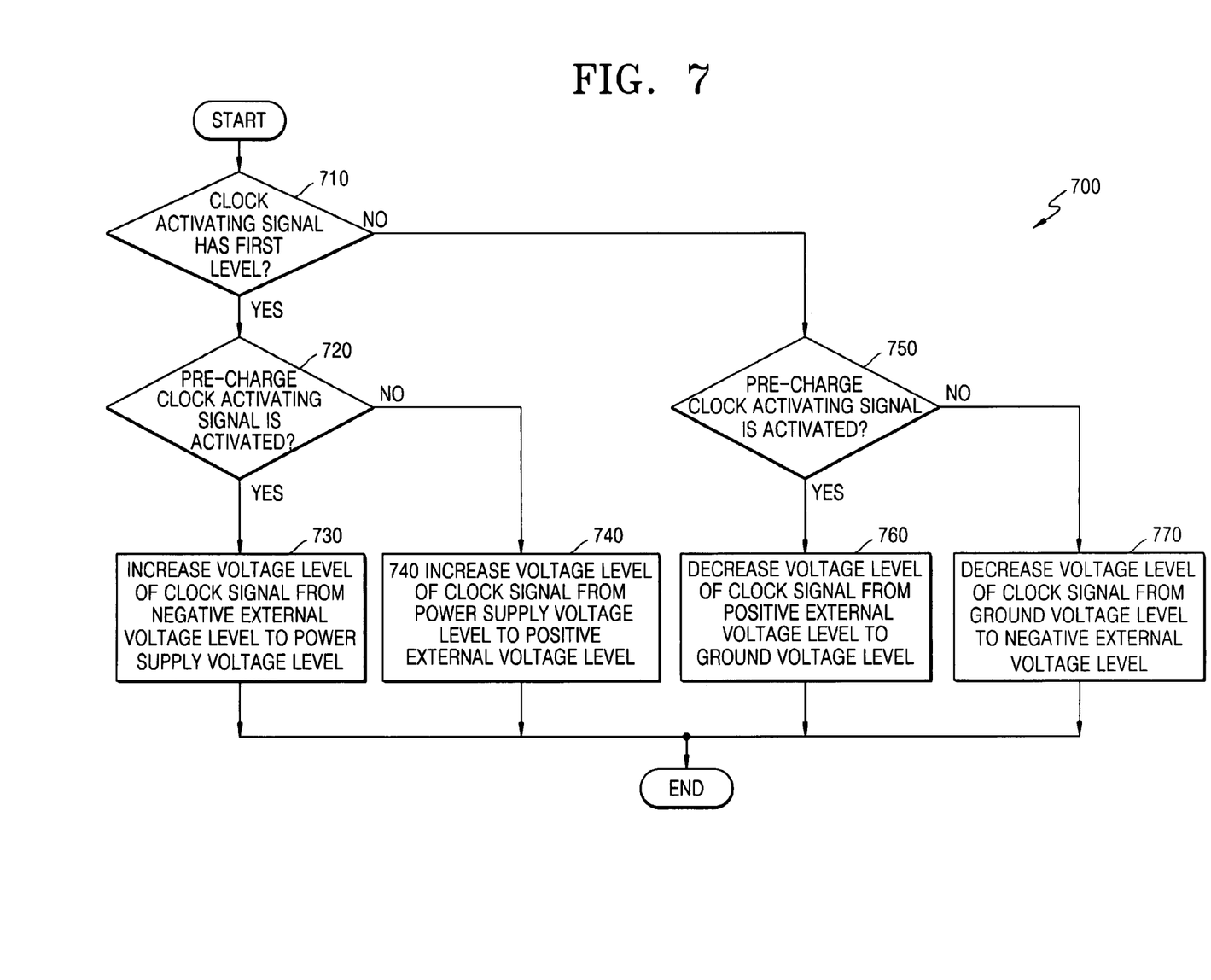
FIG. 7 shows a flow diagram indicating a method of controlling a voltage level of a clock signal.

As shown in FIG. 7, a flow diagram showing a method of controlling a voltage level of a clock signal is indicated generally by the reference numeral 700.

Figure 8:
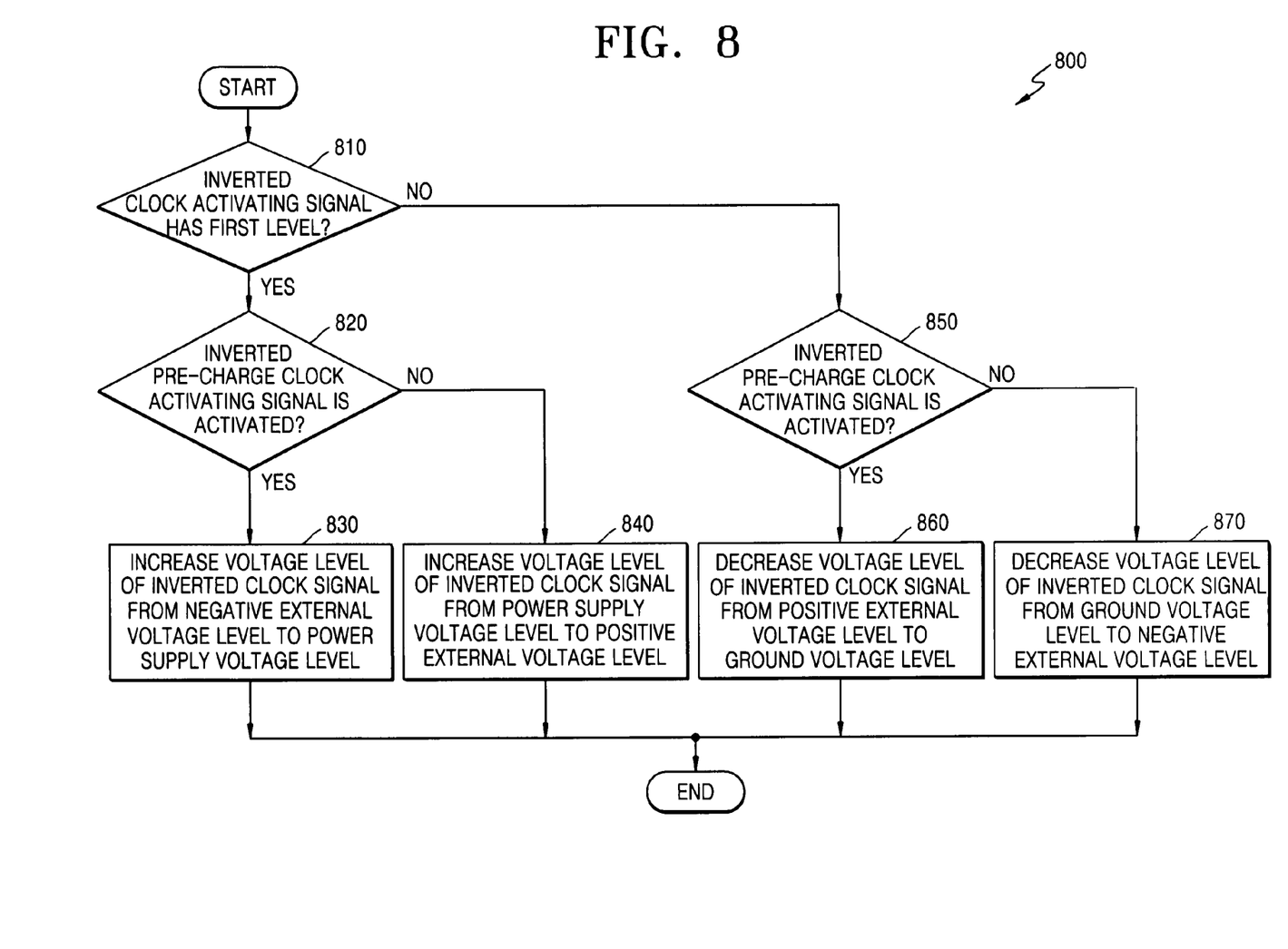
FIG. 8 shows a flow diagram indicating a method of controlling a voltage level of an inverted clock signal.

Turning to FIG. 8, a flow diagram showing a method of controlling a voltage level of an inverted clock signal is indicated generally by the reference numeral 800.

The operation of the exemplary level shifter circuit and an exemplary method of controlling the voltage levels of the clock signal and inverted clock signal according to an embodiment of the present disclosure will now be explained in detail with reference to FIGS. 4 to 8.

The operation of the first level shifter 410 that controls the voltage level of the clock signal CKV is described first.

Let it be assumed that the voltage level of the clock signal CKV is identical to the negative external voltage level VGOFFOUT. In step 710, it is judged whether a logic level of the clock-activating signal CL is a first level. Here, the first level is set to a high level for convenience. However, it will be apparent to those of ordinary skill in the pertinent art that the first level can be a low level.

The first level shifter 410, second level shifter 440, and a third level shifter 475 receive a select signal GLS and operate when the select signal GLS is activated. That is, the first, second and third level shifters 410, 440 and 475 operate only when the select signal GLS has a high level.

In step 720, it is determined whether the pre-charge clock-activating signal PRD_CL is activated when the clock-activating signal CL has the first level.

Referring to FIG. 5, the pre-charge clock activating signal PRD_CL is activated for a predetermined period of time after the rising edge of the clock activating signal CL and for a predetermined period of time after the falling edge of the clock activating signal CL. The pre-charge clock activating signal PRD_CL is activated when it has a low level and inactivated when it has a high level. The period of time T1 for which the pre-charge clock activating signal PRD_CL is activated can be determined for the level shifter circuit 400 to meet application requirements.

While the pre-charge clock-activating signal PRD-CL is activated, a first pre-charge controller 420 of the first level shifter 410 is operated but a first level controller 425 is not operated. That is, the pre-charge clock-activating signal PRD-CL turns on the first pre-charge controller 420 and turns off the first level controller 425.

A pre-charge operating signal PRDON turns on the first pre-charge controller 420 together with the pre-charge clock-activating signal PRD_CL. When the pre-charge operating signal PRDON has a high level and the pre-charge clock-activating signal PRD_CL has a low level, the first pre-charge controller 420 can be operated.

However, when the pre-charge operating signal PRDON has a low level, the first pre-charge controller 420 is not operated even if the pre-charge clock-activating signal PRD_CL has a low level.

When all of the select signal GLS for selecting the first level shifter 410, pre-charge operating signal PRDON, and clock activating signal CL have a high level, as shown in FIG. 5, the pre-charge clock activating signal PRD_CL is activated at a low level in synchronization with the rising edge of the clock activating signal CL.

Then, an inverter IV13 outputs a high level signal according to inverters IV11, IV12 and IV13 and NAND gates NAND11 and NAND12. The high level signal is applied to a second level shifting logic 438. The second level shifting logic 438 amplifies a voltage level of a signal input thereto and inverts a logic level of the input signal. Accordingly, the second level shifting logic 438 outputs a signal having a low level. Then, an inverter IV15 outputs a low level signal, and an inverter IV16 outputs a high level signal.

A first level shifting logic 435 is turned on in response to the select signal GLS. When the clock activating signal CL having a high level is input to the first level shifting logic 435, the first level shifting logic 435 amplifies the voltage level of the clock activating signal CL and inverts the logic level thereof, to thereby output a low level signal. Then, an inverter IV17 connected to the output port of the first level shifting logic 435 outputs a high level signal.

A NAND gate NAND14 receives the high level signal output from the inverter IV17 and the low level signal output from the inverter IV15 and outputs a first level control signal CTRL1 having a high level. A NOR gate NOR11 receives the high level signal output from the inverter IV17 and the high level signal output from the inverter IV16 and outputs a second level control signal CTRL2 having a low level.

The first level controller 425 includes first and second level transistors TR1 and TR2. First and second terminals of the first level transistor TR1 are connected to the positive external voltage VGH and a first node N1, respectively. The gate of the first level transistor TR1 receives the first level control signal CTRL1. First and second terminals of the second level transistor TR2 are connected to the first node N1 and negative external voltage VGOFFOUT, respectively. The gate of the first level transistor TR2 receives the second level control signal CTRL2. The clock signal CKV is output from the first node N1.

The first and second level transistors TR1 and TR2 of the first level controller 425 are turned off by the first level control signal CTRL1 having a high level and the second level control signal CTRL2 having a low level, respectively.

A NAND gate NAND13 receives the high level signal output from the inverter IV17 and the high level signal output from the inverter IV16 and outputs a first pre-charge control signal PCTRL1 having a low level.

A NOR gate NOR12 receives the high level signal output from the inverter IV17 and the low level signal output from the inverter IV15 and outputs a second pre-charge control signal PCTRL2 having a low level.

The first pre-charge controller 420 includes first and second pre-charge transistors PTR1 and PTR2. First and second terminals of the first pre-charge transistor PTR1 are connected to the power supply voltage VCI and the first node N1, respectively. The gate of the first pre-charge transistor PTR1 receives the first pre-charge control signal PCTRL1. First and second terminals of the second pre-charge transistor PTR2 are connected to the first node N1 and the ground voltage GND, respectively. The gate of the second pre-charge transistor PTR2 receives the second pre-charge control signal PCTRL2.

The first pre-charge transistor PTR1 of the first pre-charge controller 420 is turned on by the first pre-charge control signal PCTRL1 having a low level. The second pre-charge transistor PTR2 of the first pre-charge controller 420 is turned off by the second pre-charge control signal PCTRL2 having a low level.

Accordingly, the first level shifter 410 increases the voltage level of the clock signal CKV from the negative external voltage level VGOFFOUT to the power supply voltage level VCI while the pre-charge clock activating signal PRD_CL is activated for T1 in step 730. Here, the power supply voltage VCI is an external voltage applied to the level shifter circuit 400 and has a level lower than the positive external voltage level VGH.

When the logic levels of the clock activating signal CL, select signal GLS, and pre-charge operating signal PRDON are not changed and the pre-charge clock activating signal PRD_CL is changed from a low level to a high level, the NAND gate NAND13 receives the high level signal output from the inverter IV17 and the low level signal output from the inverter IV16 and outputs the first pre-charge control signal PCTRL1 having a high level.

The NOR gate NOR12 receives the high level signal output from the inverter IV17 and the high level signal output from the inverter IV15 and outputs the second pre-charge control signal PCTRL2 having a low level.

The first and second pre-charge transistors PTR1 and PTR2 of the first pre-charge controller 420 are turned off by the first pre-charge control signal PCTRL1 having a high level and the second pre-charge control signal PCTRL2 having a low level, respectively.

The NAND gate NAND14 receives the high level signal output from the inverter IV17 and the high level signal output from the inverter IV15 and outputs the first level control signal CTRL1 having a low level.

The NOR gate NOR11 receives the high level signal output from the inverter IV17 and the low level signal output from the inverter IV16 and outputs the second level control signal CTRL2 having a low level.

The first level control signal CTRL1 having a low level turns on the first level transistor TR1 of the first level controller 425, and the second level control signal CTRL2 having a low level turns off the second level transistor TR2 of the first level controller 425.

The first level shifter 410 increases the voltage level of the clock signal CKV from the power supply voltage level VCI to the positive external voltage level VGH while the pre-charge clock activating signal PRD_CL is inactivated at a high level and the clock activating signal CL has a high level in step 740.

In contrast, the conventional level shifter circuit 300 of FIG. 3 increases the voltage level of the clock signal CKV from the negative external voltage level VGOFFOUT to the positive external voltage level VGH using the positive external voltage VGH while the clock activating signal CL has a high level. Accordingly, current consumption is increased in proportion to the increased voltage level.

The level shifter circuit 400 of the present disclosure activates the pre-charge clock-activating signal PRD_CL at a low level for a predetermined period of time T1 while the clock-activating signal CL has a high level. In addition, the level shifter circuit 400 increase the voltage level of the clock signal CKV from the negative external voltage level VGOFFOUT to the power supply voltage level VCI using the power supply voltage VCI, and then raises the voltage level of the clock signal CKV from the power supply voltage level VGH to the positive external voltage level VGH using the positive external voltage VGH. That is, the level shifter circuit 400 of the present disclosure uses the battery voltage to increase the voltage level of the clock signal CKV, thereby reducing current consumption.

Next, the operation of the level shifter circuit 400 when the select signal GLS and pre-charge operating signal PRDON are maintained at a high level and the clock activating signal CL is changed to a low level is explained.

When the clock-activating signal CL has a low level, it is judged whether the pre-charge clock-activating signal PRD_CL is activated in step 750. The pre-charge clock-activating signal PRD_CL is activated at a low level in synchronization with the falling edge of the clock-activating signal CL.

Then, the inverter IV13 outputs a high level signal according to the inverters IV11, IV12 and IV13 and the NAND gates NAND11 and NAND12, and the high level signal is applied to the second level shifting logic 438, which outputs a low level signal. Thus, the inverter IV15 outputs a low level signal and the inverter IV16 outputs a high level signal.

The first level shifting logic 435 is turned on in response to the select signal GLS. When the clock activating signal CL having a low level is input to the first level shifting logic 435, the first level shifting logic 435 amplifies the voltage level of the clock activating signal CL and inverts the logic level thereof to output a high level signal. Then, the inverter IV17 outputs a low level signal.

The NAND gate NAND14 receives the low level signal output from the inverter IV17 and the low level signal output from the inverter IV15 and outputs the first level control signal CTRL1 having a high level. The NOR gate NOR11 receives the low level signal output from the inverter IV17 and the high level signal output from the inverter IV16 and outputs the second level control signal CTRL2 having a low level.

The first level control signal CTRL1 having a high level and the second level control signal CTRL2 having a low level turn off the first and second level transistors TR1 and TR2 of the first level controller 425, respectively.

The NAND gate NAND13 receives the low level signal output from the inverter IV17 and the high level signal output from the inverter IV16 and outputs the first pre-charge control signal PCTRL1 having a high level. The NOR gate NOR12 receives the low level signal output from the inverter IV17 and the low level signal output from the inverter IV15 and outputs the second pre-charge control signal PCTRL2 having a high level.

The first and second pre-charge control signals PCTRL1 and PCTRL2 having a high level turn off the first pre-charge transistor PTR1 of the first pre-charge controller 420 and turns on the second pre-charge transistor PTR2 thereof, respectively.

Accordingly, the first level shifter 410 decreases the voltage level of the clock signal CKV from the positive external voltage level VGH to the ground voltage level GND while the pre-charge clock activating signal PRD-CL is activated for T1 in step 760.

When the logic levels of the clock activating signal CL, select signal GLS and pre-charge operating signal PRDON are not changed and the logic level of the pre-charge clock activating signal PRD_CL is changed from a low level to a high level, the NAND gate NAND13 receives the low level signal output from the inverter IV17 and the low level signal output from the inverter IV16 and outputs the first pre-charge control signal PCTRL1 having a high level. The NOR gate NOR12 receives the low level signal output from the inverter IV17 and the high level signal output from the inverter IV15 and outputs the second pre-charge control signal PCTRL2 having a low level.

The first pre-charge control signal PCTRL1 having a high level and the second pre-charge control signal PCTRL2 having a low level turn off the first and second pre-charge transistors PTR1 and PTR2 of the first pre-charge controller 420, respectively.

The NAND gate NAND14 receives the low level signal output from the inverter IV17 and the high level signal output from the inverter IV15 and outputs the first level control signal CTRL1 having a high level. The NOR gate NOR11 receives the low level signal output from the inverter IV17 and the low level signal output from the inverter IV16 and outputs the second level control signal CTRL2 having a high level.

The first and second level control signals CTRL1 and CTRL2 having a high level turn off the first level transistor TR1 of the first level controller 425 and turn on the second level transistor TR2 thereof, respectively.

Accordingly, the first level shifter 410 decreases the voltage level of the clock signal CKV from the ground voltage level GND to the negative external voltage level VGOFFOUT while the pre-charge clock activating signal PRD_CL is inactivated at a high level and the clock activating signal CL has a low level.

In contrast, the conventional level shifter circuit 300 of FIG. 3 drops the voltage level of the clock signal CKV from the positive external voltage level VGH to the negative external voltage level VGOFFOUT using the negative external voltage VGOFFOUT while the clock activating signal CL has a low level. Thus, current consumption by the conventional level shifter circuit 300 is increased in proportion to the dropped voltage level.

The level shifter circuit 400 of the present disclosure activates the pre-charge clock-activating signal PRD_CL at a low level for a predetermined period of time T1 while the clock-activating signal CL has a low level. In addition, the level shifter circuit 400 decreases the voltage level of the clock signal CKV from the positive external voltage level VGH to the ground voltage level GND, and then drops it from the ground voltage level GND to the negative external voltage level VGOFFOUT using the negative external voltage level VGOFFOUT. That is, the level shifter circuit 400 of the present disclosure can reduce current consumption by using the ground voltage GND to decrease the voltage level of the clock signal CKV.

The level shifter circuit 400 of the disclosure increases the voltage level of the clock signal CKV to the power supply voltage level VCI and decreases it to the ground voltage level GND. This is shown in FIG. 6.

The level shifter circuit 400 of the disclosure increases the voltage level of the clock signal CKV using the power supply voltage VCI that has the highest voltage level among external voltages applied to the level shifter circuit 400, and decreases the voltage level of the clock signal CKV using the ground voltage GND that has the lowest voltage level among the external voltages applied to the level shifter circuit 400. Thus, the level shifter circuit 400 of the disclosure can maximise pre-charge effect when increasing or decreasing the voltage of the clock signal CKV.

The second level shifter 440 increases or decreases the inverted clock signal CKVB. Similarly to the operation of the first level shifter 410, the second level shifter 440 increases a voltage level of the inverted clock signal CKVB from the negative external voltage level VGOFFOUT through the power supply voltage level VCI to the positive external voltage level VGH, or decreases it from the positive external voltage level VGH through the ground voltage level GND to the negative external voltage level VGOFFOUT.

As shown in FIG. 5, the clock signal CKV has a phase opposite to that of the inverted clock signal CKVB. That is, the clock signal CKV has a high level when the inverted clock signal has a low level, and the clock signal CKV has a low level when the inverted clock signal has a high level.

When the shift registers SR1, SR2, SR3 and SR4 of the gate driver 110 of FIG. 2 are operated in response to the clock signal CKV having a high level and the inverted clock signal having a high level, the operation speed of turning on the gate lines can be increased twice, compared to the case where the shift registers SR1, SR2, SR3 and SR4 are operated in response to only the clock signal CKV having a high level.

Accordingly, the level shifter circuit 400 of the present disclosure controls even the voltage level of the inverted clock signal CKVB using the second level shifter 440.

The operation of the second level shifter 440 corresponds to a method 800 of controlling the voltage level of the inverted clock signal CKVB, shown in FIG. 8.

The configuration of the second level shifter 440 is identical to that of the first level shifter 410 except that the second level shifter 440 uses the inverted clock activating signal SFTCLK and inverted pre-charge clock activating signal PRD_SFTCLK while the first level shifter 410 uses the clock activating signal CL and pre-charge clock activating signal PRD_CL.

Since the operation of the first level shifter 410 and the method 700 of controlling the voltage level of the clock signal CKV have been explained in detail, detailed explanations for the operation of the second level shifter 440 and the method 800 of controlling the voltage level of the inverted clock signal CKVB are omitted.

The level shifter circuit 400 further includes the third level shifter 475. The third level shifter 475 generates the start pulse STV that is activated for each frame in response to the select signal GLS and frame driving signal FLM, and controls a voltage level of the start pulse STV to swing between the negative external voltage level VGOFFOUT and positive external voltage level VGH.

The start pulse STV generated by the third level shifter 475 activates the first shift register SR1 of the gate driver 110 of FIG. 2. The start pulse STV is activated only once for each frame so that current consumed for increasing or decreasing the voltage level of the start pulse is insignificant.

Accordingly, the third level shifter 475 does not have the same pre-charge configuration as that of the first level shifter 410 or second level shifter 440. The configuration and operation of the third level shifter 475 that generates the start pulse STV are identical to those of the third level shifter of the conventional level shifter circuit 300 (shown in FIG. 3) so that detailed explanations therefore are omitted.

As described above, the level shifter circuit and method of controlling the voltage levels of the clock signal and inverted clock signal according to the present disclosure increases or decreases the voltage levels of the clock signal and inverted clock signal using the battery voltage or ground voltage.

Therefore, embodiments of the present disclosure can reduce current consumption due to the increase or decrease in the voltage levels.

While the present invention has been particularly shown and described with reference to exemplary embodiments thereof, it will be understood by those of ordinary skill in the pertinent art that various changes in form and details may be made therein without departing from the spirit and scope of the present invention as defined by the following claims.

What is claimed is:

1. A level shifter circuit comprising:
   a first level shifter that controls a voltage level of a clock signal to swing between a negative external voltage level and a positive external voltage level in response to a clock activating signal, and increases the voltage level of the clock signal from the negative external voltage level to a power supply voltage level or decreases it from the positive external voltage level to a ground voltage level while a pre-charge clock activating signal is activated; and
   a second level shifter that controls a voltage level of an inverted clock signal to swing between the negative external voltage level and the positive external voltage level in response to an inverted clock activating signal, and increases the voltage level of the inverted clock signal from the negative external voltage level to the power supply voltage level or decreases it from the positive external voltage level to the ground voltage level while an inverted pre-charge clock activating signal is activated.

2. The level shifter circuit as claimed in claim 1, wherein the pre-charge clock-activating signal is activated for a predetermined period of time after the rising edge of the clock-activating signal and for a predetermined period of time after the falling edge thereof.

3. The level shifter circuit as claimed in claim 1, wherein the inverted pre-charge clock-activating signal is activated for a predetermined period of time after the rising edge of the inverted clock-activating signal and for a predetermined period of time after the falling edge thereof.

4. The level shifter circuit as claimed in claim 1, wherein the first level shifter comprises:
   a first pre-charge controller that increases the voltage level of the clock signal from the negative external voltage level to the power supply voltage level or decreases it from the positive external voltage level to the ground voltage level in response to first and second pre-charge control signals;
   a first level controller that increases the voltage level of the clock signal from the power supply voltage level to the positive external voltage level or decreases it from the ground voltage level to the negative external voltage level in response to first and second level control signals; and
   a first control logic that generates the first and second pre-charge control signals and the first and second level control signals in response to the clock activating signal, the pre-charge clock-activating signal, and a pre-charge operating signal.

5. The level shifter circuit as claimed in claim 4, wherein the first pre-charge controller is operated only when the pre-charge operating signal is activated.

6. The level shifter circuit as claimed in claim 4, wherein the first pre-charge controller includes a first pre-charge transistor having a first terminal connected to the power supply voltage, a gate receiving the first pre-charge control signal, and a second terminal connected to a first node, and a second pre-charge transistor having a first terminal connected to the first node, a gate receiving the second pre-charge control signal, and a second terminal connected to the ground voltage, and the first node outputs the clock signal.

7. The level shifter circuit as claimed in claim 4, wherein the first level controller includes a first level transistor having a first terminal connected to the positive external voltage, a gate receiving the first level control signal, and a second terminal connected to the first node, and a second level transistor having a first terminal connected to the first node, a gate receiving the second level control signal, a second terminal connected to the negative external voltage, and the first node outputs the clock signal.

8. The level shifter circuit as claimed in claim 4, wherein the first control logic generates the first and second level control signals to turn off the first level controller and generates the first and second pre-charge control signals to control the voltage level of the clock signal when the pre-charge operating signal and the pre-charge clock activating signal are activated, and when the pre-charge clock activating signal is inactivated, the first control logic generates the first and second pre-charge control signals to turn off the first pre-charge controller and generates the first and second level control signals to control the voltage level of the clock signal.

9. The level shifter circuit as claimed in claim 1, wherein the second level shifter comprises:
   a second pre-charge controller that increases the voltage level of the inverted clock signal from the negative external voltage level to the power supply voltage level or decreases it from the positive external voltage level to the ground voltage level in response to third and fourth pre-charge control signals;
   a second level controller that increases the voltage level of the inverted clock signal from the power supply voltage level to the positive external voltage level or decreases it from the ground voltage level to the negative external voltage level in response to third and fourth level control signals; and
   a second control logic that generates the third and fourth pre-charge control signals and the third and fourth level control signals in response to the inverted clock activating signal, inverted pre-charge clock activating signal, and pre-charge operating signal.

10. The level shifter circuit as claimed in claim 9, wherein the second pre-charge controller is operated only when the pre-charge operating signal is activated.

11. The level shifter circuit as claimed in claim 9, wherein the second pre-charge controller includes a third pre-charge transistor having a first terminal connected to the power supply voltage, a gate receiving the third pre-charge control signal, and a second terminal connected to a second node, and a fourth pre-charge transistor having a first terminal connected to the second node, a gate receiving the fourth pre-charge control signal, and a second terminal connected to the ground voltage, and the inverted clock signal is output from the second node.

12. The level shifter circuit as claimed in claim 9, wherein the second level controller includes a third level transistor having a first terminal connected to the positive external voltage, a gate receiving the third level control signal, and a second terminal connected to the second node, and a fourth level transistor having a first terminal connected to the second node, a gate receiving the fourth level control signal, a second terminal connected to the negative external voltage, and the inverted clock signal is output from the second node.

13. The level shifter circuit as claimed in claim 9, wherein the second control logic generates the third and fourth level control signals to turn off the second level controller and generates the third and fourth pre-charge control signals to control the voltage level of the inverted clock signal when the pre-charge operating signal and the inverted pre-charge clock activating signal are activated, and when the inverted pre-charge clock activating signal is inactivated, the second control logic generates the third and fourth pre-charge control signals to turn off the second pre-charge controller and generates the third and fourth level control signals to control the voltage level of the inverted clock signal.

14. The level shifter circuit as claimed in claim 1, wherein the first and second level shifters receive a select signal and they are operated when the select signal is activated.

15. The level shifter circuit as claimed in claim 14, further comprising a third level shifter that generates a start pulse, which is activated for each frame, in response to the select signal and a frame driving signal, and controls a voltage level of the start pulse to swing between the negative external voltage level and the positive external voltage level.

16. A method of controlling a voltage level of a clock signal of a gate driver for driving a liquid crystal display panel, comprising:
   receiving a clock activating signal and judging whether the clock-activating signal has a first level or a second level;
   judging whether a pre-charge clock-activating signal is activated when the clock-activating signal has the first level;
   increasing the voltage level of the clock signal from a negative external voltage level to a power supply voltage level when the pre-charge clock-activating signal is activated;
   increasing the voltage level of the clock signal from the power supply voltage level to a positive external voltage level when the pre-charge clock-activating signal is not activated;
   judging whether the pre-charge clock-activating signal is activated when the clock-activating signal has the second level;
   decreasing the voltage level of the clock signal from the positive external voltage level to a ground voltage level when the pre-charge clock activating signal is activated; and
   decreasing the voltage level of the clock signal from the ground voltage level to the negative external voltage level when the pre-charge clock-activating signal is not activated;

17. The method as claimed in claim 16, wherein the pre-charge clock-activating signal is activated for a predetermined period of time after the rising edge of the clock-activating signal and for a predetermined period of time after the falling edge thereof.

18. A method of controlling a voltage level of an inverted clock signal of a gate driver for driving a liquid crystal display panel, comprising:
   receiving an inverted clock activating signal and judging whether the inverted clock-activating signal has a first level or a second level;
   judging whether an inverted pre-charge clock-activating signal is activated when the inverted clock-activating signal has the first level;
   increasing the voltage level of the inverted clock signal from a negative external voltage level to a power supply voltage level when the inverted pre-charge clock-activating signal is activated;
   increasing the voltage level of the inverted clock signal from the power supply voltage level to a positive external voltage level when the inverted pre-charge clock-activating signal is not activated;
   judging whether the inverted pre-charge clock-activating signal is activated when the inverted clock-activating signal has the second level;
   decreasing the voltage level of the inverted clock signal from the positive external voltage level to a ground voltage level when the inverted pre-charge clock activating signal is activated; and
   decreasing the voltage level of the inverted clock signal from the ground voltage level to the negative external voltage level when the inverted pre-charge clock-activating signal is not activated.

19. The method as claimed in claim 18, wherein the inverted pre-charge clock-activating signal is activated for a predetermined period of time after the rising edge of the inverted clock-activating signal and for a predetermined period of time after the falling edge thereof.

20. A level shifting circuit comprising:
   first level shifting means for controlling a voltage level of a first periodic signal to swing between a negative external voltage level and a positive external voltage level in response to a first activation signal, and at least one of increasing the voltage level of the first periodic signal from a negative external voltage level to a power supply voltage level and decreasing the voltage level of the first periodic signal from a positive external voltage level to a ground voltage level; and
   second level shifting means in signal communication with the first level shifting means, the second level shifting means for controlling a voltage level of a second periodic signal to swing between the negative external voltage level and the positive external voltage level in response to a second activation signal, and at least one of increasing the voltage level of the second periodic signal from the negative external voltage level to the power supply voltage level and decreasing the voltage level of the second periodic signal from the positive external voltage level to the ground voltage level.

* * * * *